United States Patent [19]

Cantrell et al.

[11] 4,237,461
[45] Dec. 2, 1980

[54] HIGH-SPEED DIGITAL PULSE COMPRESSOR

[75] Inventors: Ben H. Cantrell, Springfield, Va.; Bernard L. Lewis, Oxon Hill, Md.

[73] Assignee: The United States of America as represented by the Secretary of the Navy, Washington, D.C.

[21] Appl. No.: 12,409

[22] Filed: Feb. 15, 1979

[51] Int. Cl.³ .............................................. G01S 13/28
[52] U.S. Cl. ............................ 343/5 FT; 343/17.2 PC
[58] Field of Search ....................... 343/5 FT, 17.2 PC

[56] References Cited

U.S. PATENT DOCUMENTS

| | | | |
|---|---|---|---|
| 3,987,285 | 10/1976 | Perry | 343/17.2 PC X |
| 4,028,700 | 6/1977 | Carey et al. | 343/5 FT X |
| 4,156,876 | 5/1979 | Debuisser | 343/17.2 PC |
| 4,167,737 | 9/1979 | Freedman | 343/17.2 PC |

OTHER PUBLICATIONS

"An Introduction to Matched Filters", by George L. Turin, IRE Transactions on Information Theory, vol. IT-6, pp. 311-328, Jun., 1960.

"On Digital Filtering", by G-AE Concepts Subcommittee, C. M. Rader, Chairman, IEEE Transactions on Audio and Electroacoustics, Sep., 1968, pp. 303-314.

Primary Examiner—Malcolm F. Hubler
Attorney, Agent, or Firm—R. S. Sciascia; Philip Schneider

[57] ABSTRACT

A pulse expansion and compression system, especially useful for radar ranging, comprising a pulse coder for expanding an input pulse and a pulse compressor of the matched-filter type. The coder consists of a plurality of delay stages into which the input pulse is fed, a discrete Fourier transform (DFT) circuit to which the output signals of the delay stages are fed, a time-dispersion-means (TDM) comprising an arrangement of delay stages for differently delaying the output signals from the DFT, and a coherent summer for adding the real and imaginary parts of the signals from the TDM. The summer output is fed to a phase modulator and then to the transmitter.

The echo signals are conjugated, time-inverted, and passed through the same DFT as the input pulse signal. The outputs of the DFT are then passed through a TDM of the same type as the first TDM, but this time in time-inverted order. The outputs of the second TDM are fed through a coherent summer and an envelope detector to provide a cross-correlated facsimile of the original input pulse.

6 Claims, 11 Drawing Figures

OUTPUT OF ENVELOPE
DETECTOR 36

HIGH-SPEED DIGITAL PULSE COMPRESSOR

BACKGROUND OF THE INVENTION

This invention relates to pulse-compression techniques and especially to a pulse-compression technique utilizing a fast Fourier transform circuit in a matched filter.

Pulse-compression techniques are used in radar ranging in order to increase the detection capability of a long-pulse radar system and yet retain the resolution capability of a narrow-pulse system. The radar pulse is expanded so that more energy can be put on the target. The received echo is processed through a matched filter which produces a narrow pulse peak when the received echo matches the propagated signal. Pulse compression provides better range resolution and greater clutter reduction. A disadvantage of conventional matched filters is that they require a large amount of electronic hardware before significant results can be obtained and ways of reducing the amount of hardware have been sought. This invention provides for reduction of the amount of hardware used in conventional pulse expansion-compression systems.

SUMMARY OF THE INVENTION

The advantages of the invention are obtained by utilizing a discrete Fourier transform circuit for the weighting means of the conventional matched-filter circuit used in pulse-compression systems and passing the signal to be coded and the return signal through the same discrete Fourier transform circuit for weighting purposes.

DETAILED DESCRIPTION OF THE INVENTION

Figure 1:
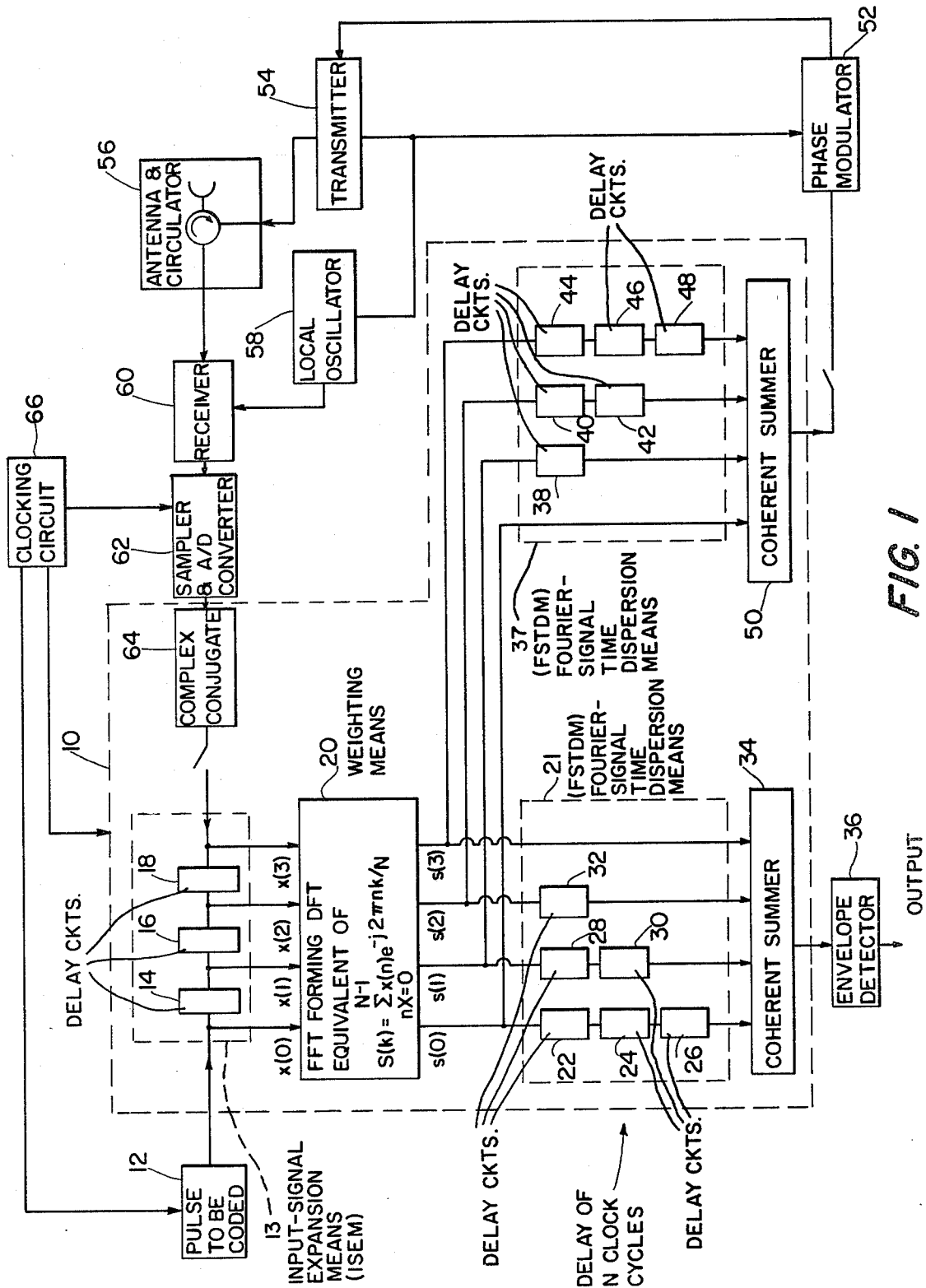
FIG. 1 is a block diagram of an embodiment of the invention.

An embodiment of the invention is shown in FIG. 1, as it might be used as part of a pulse-compression radar. The components of the invention are shown enclosed in the dashed lines. The input signal is a pulse produced by a pulse generator 12, for example. The pulse is clocked into an input-signal expansion means (ISEM) 13 providing three equal intervals of delay. The ISEM may comprise three stages 14, 16, 18 of a shift register or a delay line tapped at equal delay intervals, for example. Outputs are taken from the input to the first delay stage, the output of the first delay stage, the output of the second delay stage, and the output of the third delay stage, viz, x(0), x(1), x(2), x(3), respectively. Time zero (0) corresponds to the interval of the first clocking pulse when the pulse to be coded is clocked out of the pulse generator 12 and put on the input line to the first delay stage 14; time (1) corresponds to the interval of the second clocking pulse which permits the pulse at the input of the first delay stage 14 to pass through the stage and appear at its output with the proper delay; and so on. The clocking circuit is shown in simplified form in block 66. The ISEM 13 essentially provides for time expansion of the input pulse. It provides four input signals to the DFT, viz, 1000, 0100, 0010 and 0001, in a time which is four times as long as that of the input pulse. (Presence of a pulse is denoted by a 1, absence of a pulse by a 0.)

The signals x(0), x(1), x(2) and x(3) are fed into a weighting means 20 which weights the signals in accordance with the formula $$s(k) = \sum_{m=0}^{k-1} x(n)e^{-j2\pi nk/N}.$$

The particular type of weighting means used in this invention is a fast Fourier transform (FFT) circuit which forms discrete Fourier transform (DFT) signals equivalent to the formula given above. The weighting means 20 provides four output signals, s(0), s(1), s(2) and s(3). In the formula, n is the sequence number of the clocking signal; N is the number of delay stages plus one, since a pulse is being taken off just prior to the first delay stage; k is the number of the output signal being taken from the weighting means 20. In the example, shown $n=0, \ldots 3$, $k=0, \ldots 3$, $N=4$, although many more delay stages and outputs from the weighting means could be used, as well as fewer. In fact, as little as one delay stage could be used. A detailed discussion of the discrete Fourier transform can be read in "Digital Signal Processing," Oppenheim and Schafer, published in 1975 by Prentice-Hall, Inc., Englewood Cliffs, N.J. Various ways of implementing the weighting means are shown; in particular, see chap. 6, FIG. 6.10.

The output signals from the DFT 20 are individually fed to Fourier signal time-dispersion means 37 (FS TDM). This comprises a plurality of delay stages 38-48, each of which supplies a delay equal to four clock intervals. Thus, signal s(0) has no delay, signal 2(1) has a delay of four intervals, signal s(2) a delay of 8 intervals, and s(3) a delay of 12 intervals. The particular arrangement of the delays and the number of the delays is not fixed by any rule but is a matter of choice by the designer, the more delays inserted, the more the outgoing signal is time-expanded. As a matter of fact, the device would operate with no delays at all in the s(0), s(1), s(2) and s(3) lines but this would be undesirable since the object is to time-stretch the outgoing signal so that the increased detection capability of a long-pulse radar system can be achieved.

It should also be noted that the number of delay stages in the ISEM 13, although they may be as few as one, can be greatly increased in order to time-expand the outgoing signal.

The outputs of the FSTDM 37 are a series of complex signals which are fed to a coherent summer 50. The summer separately adds the real parts and the imaginary parts of its input signals so that a single signal with a real and an imaginary part is formed for each clocking interval. These signals are fed to a phase modulator 52 which phase-modulates the carrier signal of the transmitter, and the modulated carrier is propagated into space by the antenna.

The return signals are received, processed by the receiver 60, and fed to a sampler-and-A/D converter 62 which returns them to sample digital form.

These digital echo signals are in complex form and are fed to a conjugator circuit 64 which processes them to form their complex conjugates. These conjugate signals are fed back through the ISEM 13 in inverted order relative to the manner in which the original input pulse passed through the ISEM 13. The delayed outputs are again fed to the weighting means 20 whose output signals are now fed to a second Fourier signal time-dispersion means (FSTDM) 21 which is arranged to provide delays for the signals s(0), s(1), s(2) and s(3) which are inverted in order relative to the delays provided by the FSTDM 37 for the outgoing DFT-circuit signals.

The outputs of the FSTDM 21 are summed in a coherent summer 34 to separately add the real and the imaginary parts of its input signals for each clock period, the output signal of the summer being a cross-correlated signal which is then detected by an envelope detector 36.

The output of the coherent summer 34 is the impulse response of a matched filter which comprises complex conjugator 64, input-signal expansion means 13, weighting means 20, time-dispersion means 21 and coherent summer 34. A matched filter provides an impulse response which is the complex-conjugate, time-inverted, equivalent of the input pulse. The conjugator 64 provides the complex conjugation of the echo signals and the expansion means 13 and time-dispersion means 21 provide the time inversion of the echo signal. The matched filter also effects convolution of the received signals with the input signal. The replica of the input signal in this device is actually a product of the operation of the Fourier transform network 20.

The operation of the present invention may be explained as follows:

| | The x outputs from the ISEM (13) are | | | |
|---|---|---|---|---|
| | x(0) | x(1) | x(2) | x(3) |
| 1st clock pulse: | 1 | 0 | 0 | 0 |
| 2nd clock pulse: | 0 | 1 | 0 | 0 |
| 3rd clock pulse: | 0 | 0 | 1 | 0 |
| 4th clock pulse: | 0 | 0 | 0 | 1 |
| 5th, etc. clock pulse: | 0 | 0 | 0 | 0 |

To find the outputs of the DFT circuit for each clock pulse (CP) period, proceed as follows:

CP 1 → x(0) = 1, x(1) = 0, x(2) = 0, x(3) = 0

$n = 0 \ldots 3$
$k = 0$
$s(0) = \Sigma[x(0)e^{-j2\pi(0)(0)/4} + x(1)e^{-j2\pi(1)(0)/4} + x(2)e^{-j2\pi(2)0/4} + x(3)e^{-j2\pi(3)0/4}]$
$= \Sigma[1(1) + 0(1) + 0(1) + 0(1)] = 1$ $n = 0 \ldots 3$
$k = 1$
$s(1) = \Sigma[x(0)e^{-j2\pi(2)\frac{1}{4}} + x(1)e^{-j2\pi(1)(1)/4} + x(2)e^{-j2\pi(2)(1)/4} + x(3)e^{-j2\pi(3)\frac{1}{4}}]$ -continued $= \Sigma[1(1) + 0(-1) + 0(-1) + 0(-j)] = 1$ $n = 0 \ldots 3$
$k = 2$
$s(2) = \Sigma[x(0)e^{-j2\pi(0)2/4} + x(1)e^{-j2\pi(1)2/4} + x(2)e^{-j2\pi(2)2/4} + x(3)e^{-j2\pi(3)2/4}]$
$= \Sigma[1(1) + 0(-1) + 0(1) + 0(-1)] = 1$ $n = 0 \ldots 3$
$k = 3$
$s(3) = \Sigma[x(0)e^{-j2\pi(0)\frac{3}{4}} + x(1)e^{-j2\pi(1)\frac{3}{4}} + x(2)e^{-j2\pi(2)\frac{3}{4}} + x(3)e^{-j2\pi(3)\frac{3}{4}}]$
$= \Sigma[1(1) + 0(-1) + 0(-1) + 0(-1)] = 1$ CP 2 → x(0) = 0, x(1) = 1, x(2) = 0, x(3) = 0

$n = 0 \ldots 3$
$k = 0$
$s(0) = \Sigma[x(0)e^{-j2\pi(0)0/4} + x(1)e^{-j2\pi(1)0/4} + x(2)e^{-j2\pi(2)0/4} + x(3)e^{-j2\pi(3)0/4}]$
$= \Sigma[0(1) + 1(1) + 0(1) + 0(1)] = 1$ $n = 0 \ldots 3$
$k = 1$
$s(1) = \Sigma[x(0)e^{-j2\pi(0)\frac{1}{4}} + x(1)e^{-j2\pi(1)(1)/4} + x(2)e^{-j2\pi(2)\frac{1}{4}} + x(3)e^{-j2\pi(3)\frac{1}{4}}]$
$= \Sigma[0(1) + 1(-j) + 0(-1) + 0(j)] = -j$ $n = 0 \ldots 3$
$k = 2$
$s(2) = \Sigma[x(0)e^{-j2\pi(0)2/4} + x(1)e^{-j2(1)2/4} + x(2)e^{-j2\pi(2)2/4} + x(3)e^{-j2\pi(3)2/4}]$
$= \Sigma[0(1) + 1(-1) + 0(1) + 0(-1)] = -1$ $n = 0 \ldots 3$
$k = 3$
$s(3) = \Sigma[x(0)e^{-j2\pi(0)\frac{3}{4}} + x(1)e^{-j2\pi(1)\frac{3}{4}} + x(2)e^{-j2\pi(2)\frac{3}{4}} + x(3)e^{-j2\pi(3)\frac{3}{4}}]$
$= \Sigma[0(1) + 1(+j) + 0(-1) + 0(-1)] = +j$ The same calculations can be made for clock pulses 3 and 4. A tabulation of the (s) outputs is provided below:

| | CP 1 | CP 2 | CP 3 | CP 4 |
|---|---|---|---|---|
| s(0) | 1 | 1 | 1 | 1 |
| s(1) | 1 | −j | −1 | +j |
| s(2) | 1 | −1 | 1 | −1 |
| s(3) | 1 | +j | −1 | −j |

Figure 2:
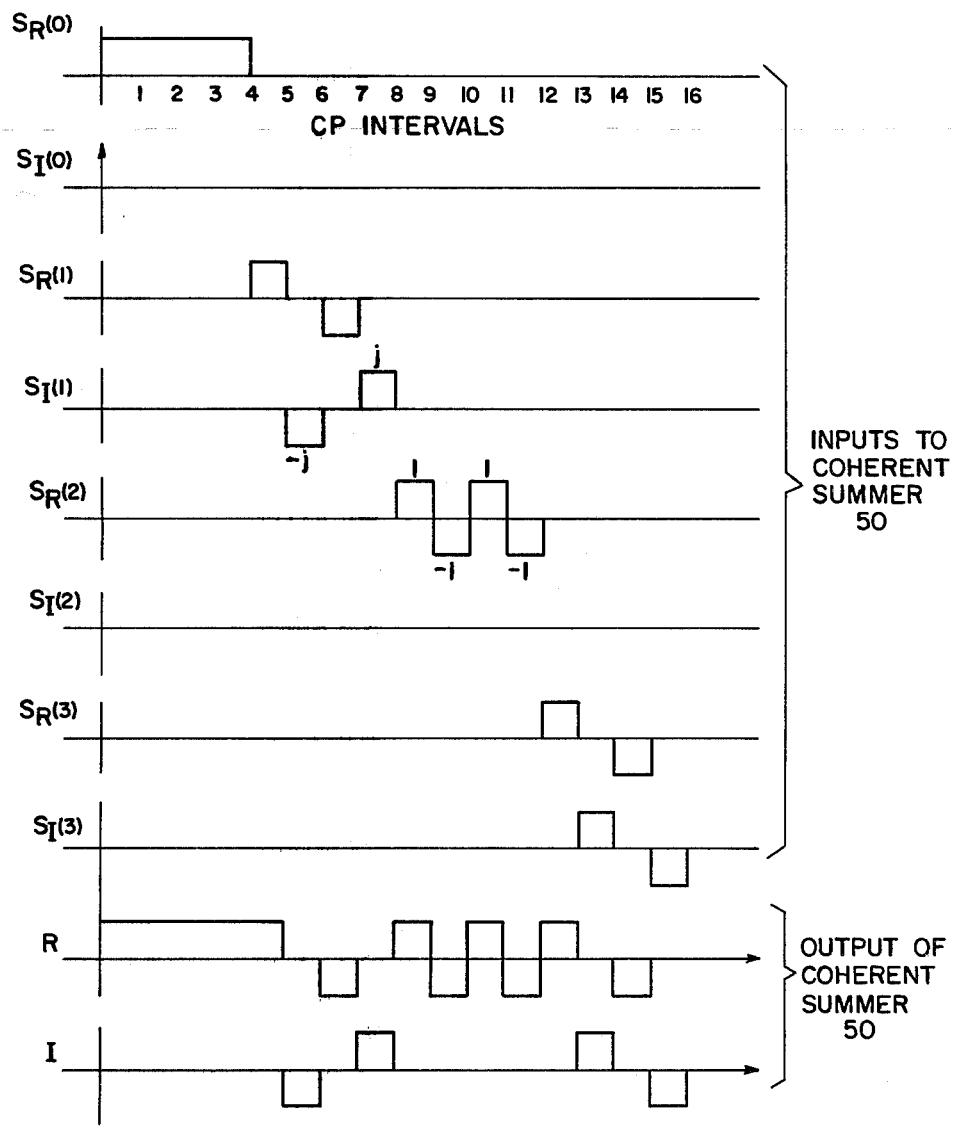
FIG. 2 is an illustration of the waveforms of the input signals to the transmitted-signal coherent summer 50 and of its output signal.
Figure 3:
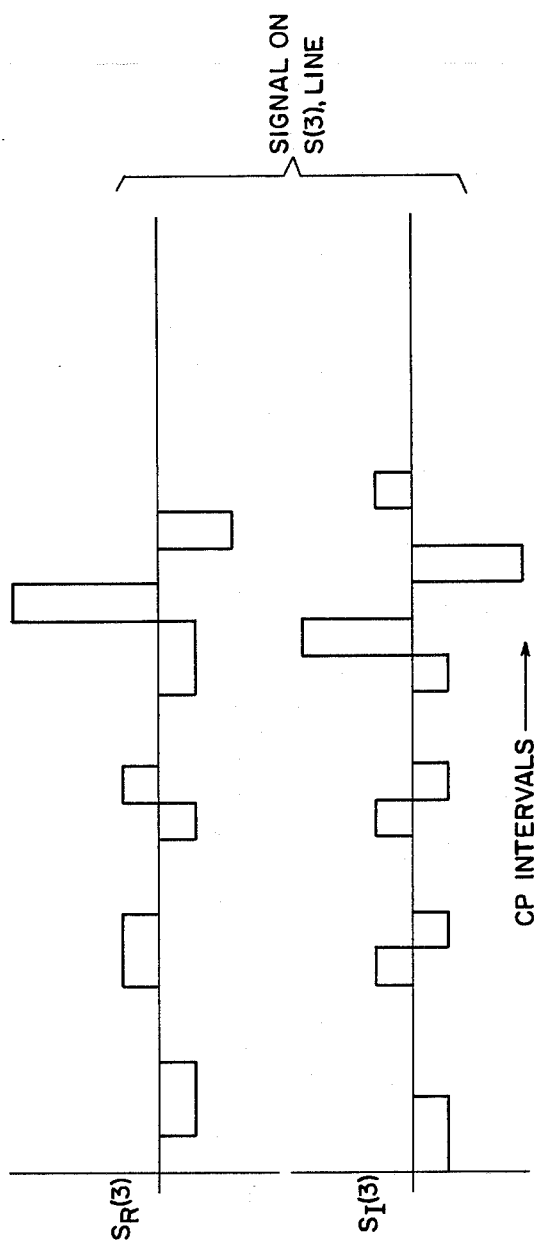
FIG. 3 is an illustration of the real and imaginary parts of the input to the matched-signal coherent summer 34 on line s(3).

These outputs are fed to the output-, or transmitted-, signal coherent summer 50 through the FSTDM delays. For the first four clock pulses, the only inputs to the summer are the signals on the s(0) line; for the next four clock pulses, the signals on the s(1) line; for the next four, the signals on the s(2) line; and for the next four, the signals on the s(3) line. These are shown graphically in FIG. 2. For example, the figure shows the real $[s_R(1)]$ and the imaginary $[s_I(1)]$ parts of the signal on the s(1) line. The last two lines labelled R and I are the real and imaginary parts of the output from the coherent summer 50. This signal modulates the phase of the transmitter carrier wave. Note that the output signal extends over 16 clock pulse periods. The signal fed to the phase modulator 52 is (1) (1) (1) (1) (1) (−j) (−1) (+j) (1) (−1) (1) (−1) (1) (+j) (−1) (−j).

The phase-modulated carrier is propagated through space and, if the signal strikes a target, an echo signal is returned. This echo signal is processed through the receiver 60 and sent through a sampler-and-A/D converter circuit 62 which converts the phase-modulated carrier into a digitized signal again. The complex conjugate of the digitized signal is taken and fed to the ISEM 13. The output of the complex conjugator is: (1) (1) (1) (1) (1) (j) (−1) (−j) (1) (−1) (1) (−1) (1) (−j) (−1) (j).

This signal is fed to the ISEM 13 but the ISEM delays are now in time-inverted order, that is, x(3) now has no delay, x(2) is delayed one clock interval, x(1) two clock intervals and x(0) three clock intervals. The time-inverted, delayed echo signals are fed through the weighting means 20 to the second FSTDM 21 which is arranged in time-inverted order relative to the first FSTDM 37. Thus, no delay is inserted in signal s(3), four units of delay in s(2), eight units of delay in s(1), and twelve units of delay in s(0). No matter how many units of delay are used in whatever arrangement in the first FSTDM 37, it is essential for a matched filter that the arrangement be the same for the second FSTDM 21 except that it must be time-inverted.

Figure 4:
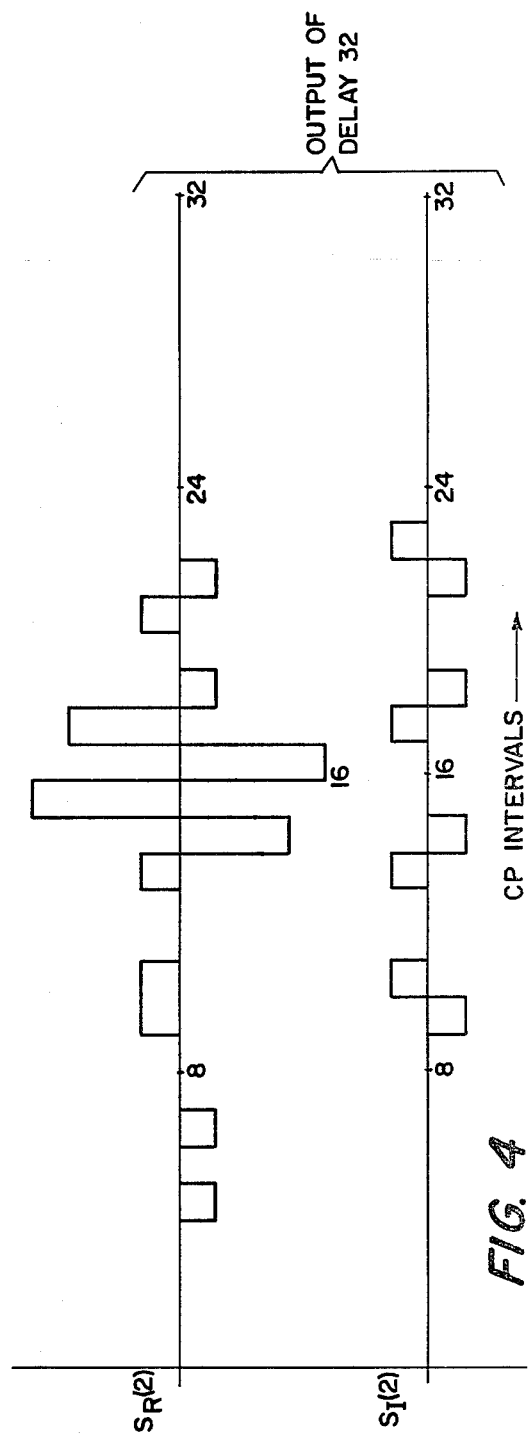
FIG. 4 is an illustration of the input to the matched-signal coherent summer on line s(2).
Figure 5:
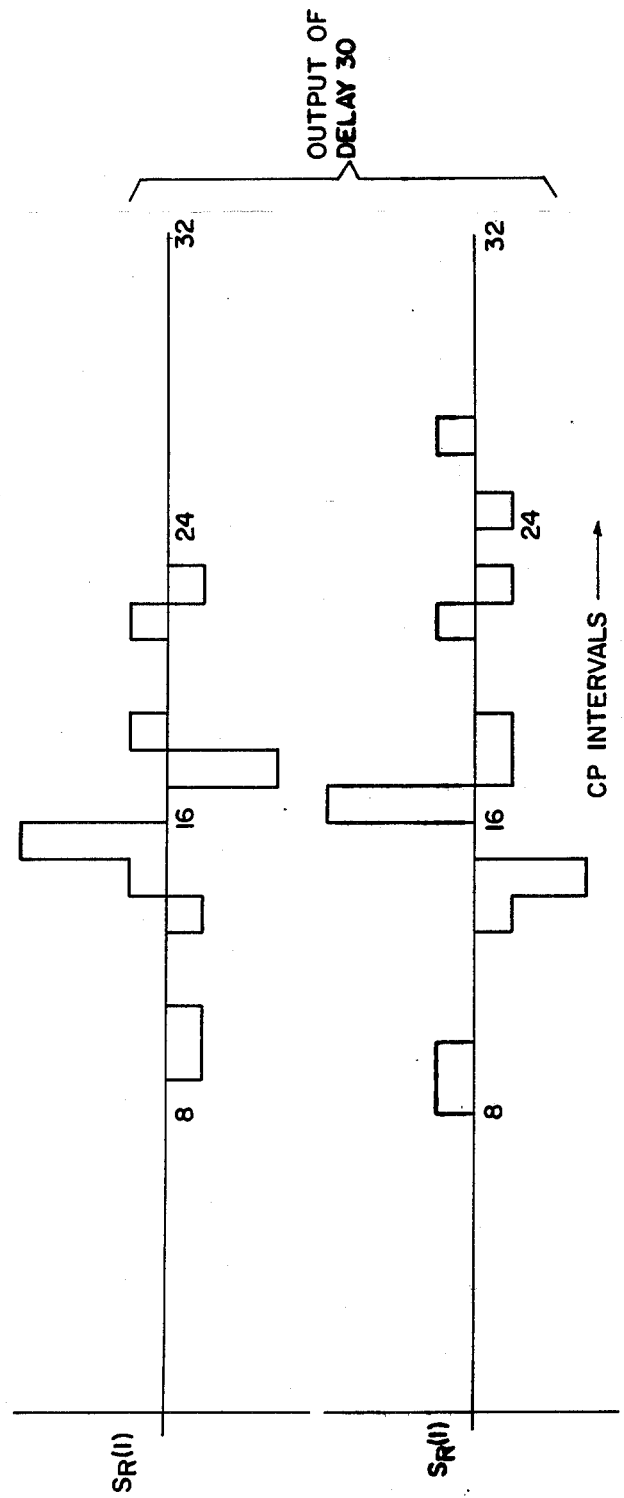
FIG. 5 is an illustration of the input to the matched-signal coherent summer on line s(1).
Figure 6:
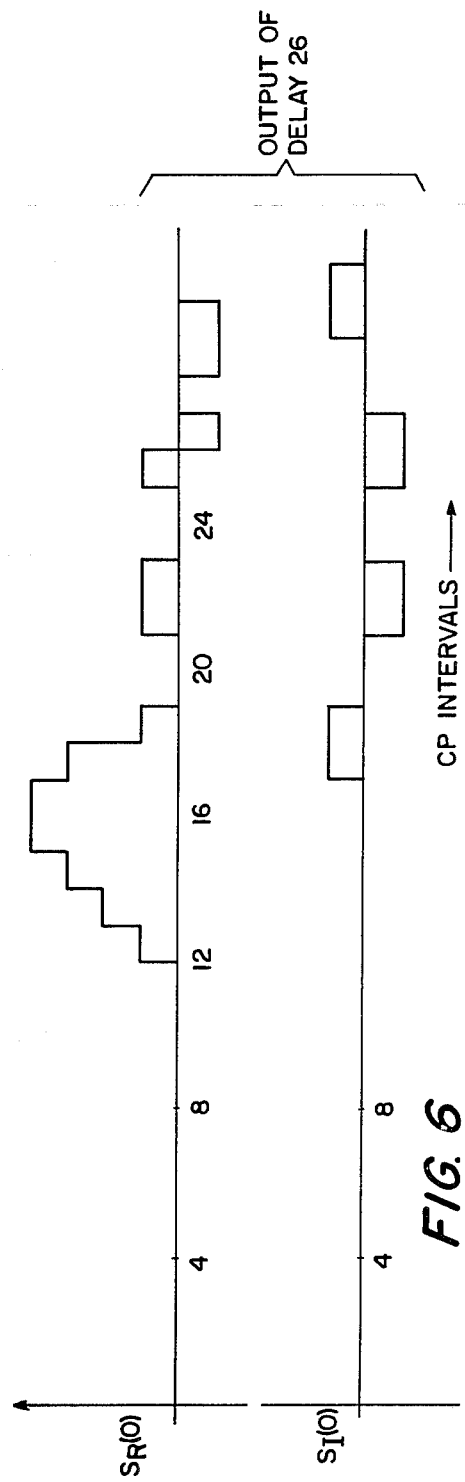
FIG. 6 is an illustration of the input to the matched-signal coherent summer on line s(0).
Figure 7:
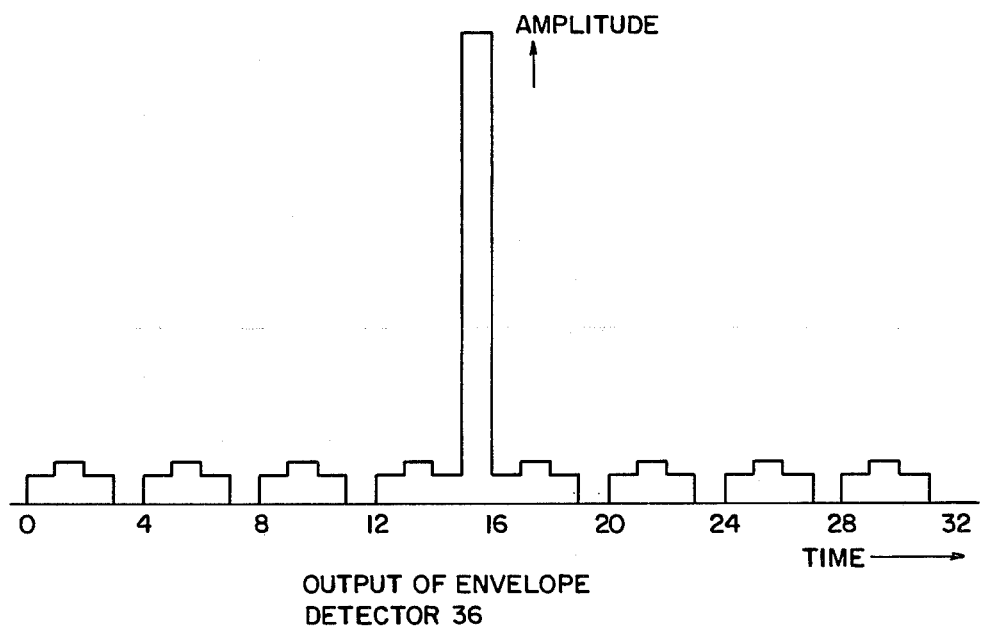
FIG. 7 is an illustration of the output of the envelope detector 36.

The inputs to the matched-signal coherent summer 34 are shown in FIGS. 3–6, FIG. 3 being the signal on line s(3), FIG. 4 the output of delay 32, FIG. 5 the output of delay 30, and FIG. 6 the output of delay 26. These figures show the real (R) and imaginary (I) parts of the signals and the assumption has been made herein that the echo signals have not been phase-shifted upon reflection from the target. The output of the coherent summer has a peak pulse in the sixteenth clock pulse interval, which can be seen in FIG. 7, the output of the envelope detector 36.

Figure 8:
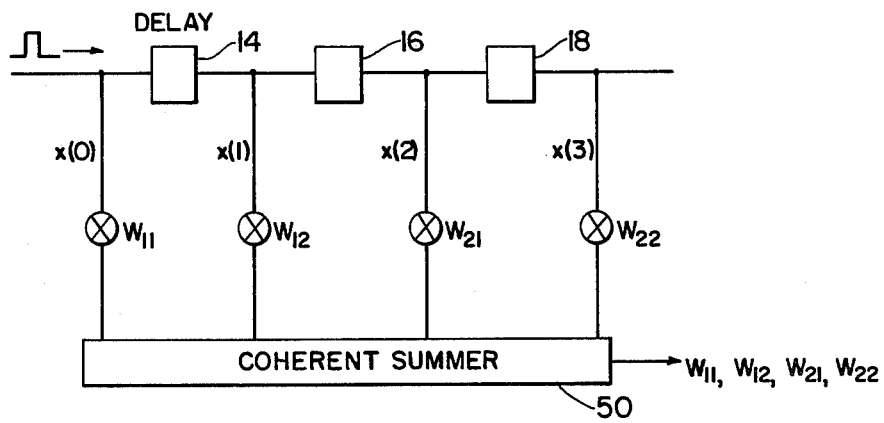
FIG. 8 is a block diagram of a conventional, simple, pulse code generator.

It will be observed that this output signal is typically the type of signal which results from convolution, a process which occurs as a result of passing the echo signal through the matched filter of the invention. To show this, let us consider what happens in a simple conventional code generator and cross-correlation receiver. FIG. 8 shows a simple code generator wherein an input pulse is clocked through three delay stages 14, 16, and 18 as in the present invention. The weighting circuit consists of four weights $W_{11}$, $W_{12}$, $W_{21}$ and $W_{22}$ which weight the pulses, the real and imaginary parts of the weighted signals being separately added in the coherent summer 50 to provide four output signals which correspond to the weights $W_{11}$, $W_{12}$, $W_{21}$ and $W_{22}$.

Figure 9:
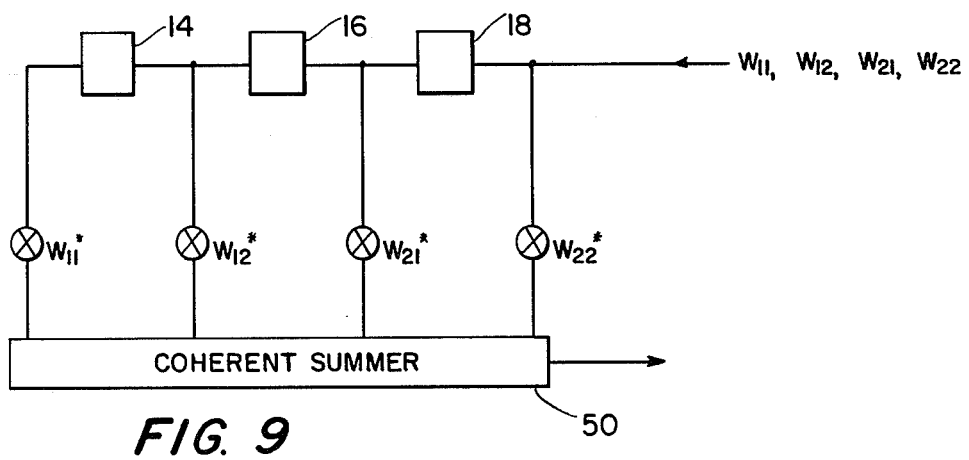
FIG. 9 is a block diagram of a conventional, simple matched filter.

Let these output signals be fed back through the matched filter, or cross-correlation circuit, shown in FIG. 9. The signals are fed to the delays in time-inverted order and the weights here correspond to the complex conjugates of the original weights, i.e., $W_{11}^*$, $W_{12}^*$, $W_{21}^*$, and $W_{22}^*$. The outputs on successive pulse samples are given below:

| CP 1 | - | $W_{11}W_{22}^*$ |
| CP 2 | - | $W_{11}W_{21}^* + W_{12}W_{22}^*$ |
| CP 3 | - | $W_{11}W_{12}^* + W_{12}W_{21}^* + W_{21}W_{22}^*$ |
| CP 4 | - | $W_{11}W_{11}^* + W_{12}W_{12}^* + W_{21}W_{21}^* + W_{22}W_{22}^*$ (matched output) |
| CP 5 | - | $W_{12}W_{11}^* + W_{21}W_{12}^* + W_{22}W_{21}^*$ |
| CP 6 | - | $W_{21}W_{11}^* + W_{22}W_{12}^*$ |
| CP 7 | - | $W_{22}W_{11}^*$ |
| CP 8 | - | 0 |

The output on the fourth clock pulse is the matched output.

Figure 10:
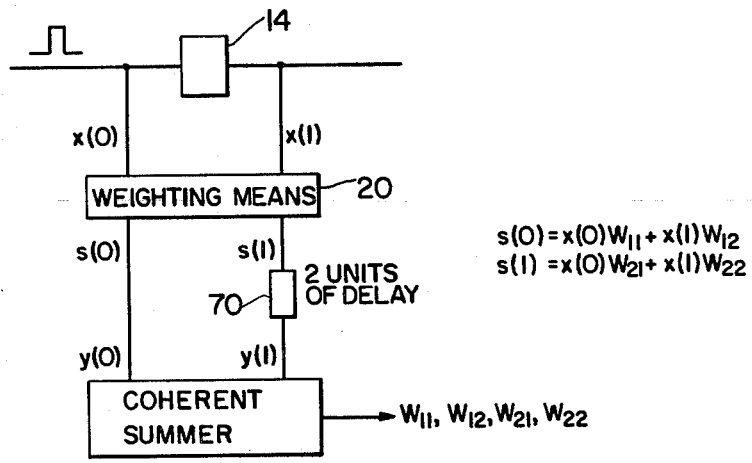
FIG. 10 is a block diagram of a simplified coder in accordance with the present invention.
Figure 11:
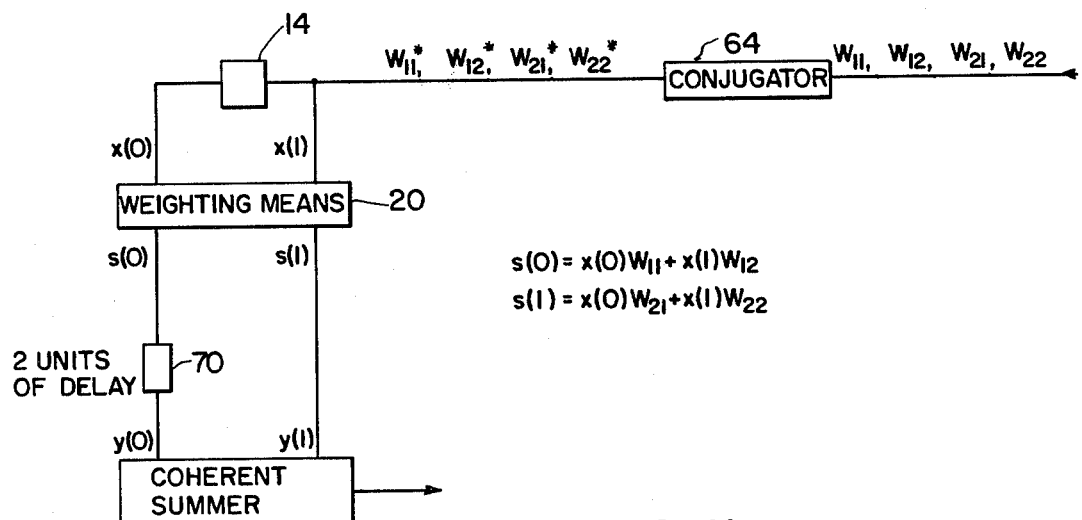
FIG. 11 is a block diagram of a simplified matched filter in accordance with the present invention.

Now consider a simple coder and matched filter in accordance with the present invention, as shown in FIGS. 10 and 11. The weighting means provides weights $W_{11}$, $W_{12}$, $W_{21}$ and $W_{22}$, as in the conventional coder, and is designed to provide the following outputs:

$s(0) = x(0)W_{11} + x(1)W_{12}$ and
$s(1) = x(0)W_{21} + x(1)W_{22}$

The following shows the values of the various signals on four clock pulses:

| CP 1: | x(0) = 1 | s(0) = $W_{11}$ | y(0) = $W_{11}$ | output $W_{11}$ |
|---|---|---|---|---|
| | x(1) = 0 | s(1) = $W_{21}$ | y(1) = 0 | |
| CP 2: | x(0) = 0 | s(0) = $W_{12}$ | y(0) = $W_{12}$ | output $W_{12}$ |
| | x(1) = 1 | s(1) = $W_{22}$ | y(1) = 0 | |
| CP 3: | x(0) = 0 | s(0) = 0 | y(0) = 0 | output $W_{21}$ |
| | x(1) = 0 | s(1) = 0 | y(1) = $W_{21}$ | |
| CP 4: | x(0) = 0 | s(0) = 0 | y(0) = 0 | output $W_{22}$ |
| | x(1) = 0 | s(1) = 0 | y(1) = $W_{22}$ | |

The s values are obtained by substituting the x values in the equations for s. The y values are obtained by taking into account the two delay units inserted by delay circuit 20.

If the outputs are then fed through a conjugator 64, they become $W_{11}^*$, $W_{12}^*$, $W_{21}^*$ and $W_{22}^*$. The matched filter is shown in FIG. 11. The same delay means 14 and weighting means 20 are used but the conjugated signals are time-inverted through the delay means 14. The s equations of the weighting means are the same as before (see FIG. 10). The signals for the various clock pulses are given below:

| CP 1: | x(0) = 0 | s(0) = $W_{11}^* W_{12}$ | y(0) = 0 |
|---|---|---|---|
| | x(1) = $W_{11}^*$ | s(1) = $W_{11}^* W_{22}$ | y(1) = $W_{11}^* W_{22}$ = sum |
| CP 2: | x(0) = $W_{11}^*$ | s(0) = $W_{11}W_{11}^* + W_{12}W_{12}^*$ | y(0) = 0 |
| | x(1) = $W_{12}^*$ | s(1) = $W_{11}^*W_{21} + W_{12}^*W_{22}$ | y(1) = $W_{11}^*W_{21} + W_{12}^*W_{22}$ = sum |
| CP 3: | x(0) = $W_{12}^*$ | s(0) = $W_{12}^*W_{11} + W_{21}^*W_{12}$ | y(0) = $W_{11}^*W_{12}$ |
| | x(1) = $W_{21}^*$ | s(1) = $W_{12}^*W_{21} + W_{21}^*W_{22}$ | y(1) = $W_{12}^*W_{21} + W_{21}^*W_{22}$ |
| | | Sum = $W_{11}^*W_{12} + W_{12}^*W_{21} + W_{21}^*W_{22}$ | |
| CP 4: | x(0) = $W_{21}^*$ | s(0) = $W_{21}^*W_{11} + W_{22}^*W_{12}$ | y(0) = $W_{11}W_{11}^* + W_{12}W_{12}^*$ |
| | x(1) = $W_{22}^*$ | s(1) = $W_{21}^* W_{21} + W_{22}^*W_{22}$ | y(1) = $W_{21}^* W_{21} + W_{22}^*W_{22}$ |
| | | Sum = $W_{11}W_{11}^* + W_{12}W_{12}^* + W_{21}^*W_{21} + W_{22}^*W_{22}$ (matched output) | |
| CP 5: | x(0) = $W_{22}^*$ | s(0) = $W_{22}^*W_{11}$ | y(0) = $W_{12}^*W_{11} + W_{21}^*W_{12}$ |
| | x(1) = 0 | s(1) = $W_{22}^*W_{21}$ | y(1) = $W_{22}^*W_{21}$ |
| | | Sum = $W_{12}^*W_{11} + W_{21}^*W_{12} + W_{22}^*W_{21}$ | |
| CP 6: | x(0) = 0 | s(0) = 0 | y(0) = $W_{21}^*W_{11} + W_{22}^*W_{12}$ = Sum |
| | x(1) = 0 | s(1) = 0 | y(1) = 0 |
| CP 7: | x(0) = 0 | s(0) = 0 | y(0) = $W_{22}^*W_{11}$ = Sum |
| | x(1) = 0 | s(1) = 0 | y(1) = 0 |
| CP 8: | x(0) = 0 | s(0) = 0 | y(0) = 0 |
| | x(1) = 0 | s(1) = 0 | y(1) = 0 |

Note that the output from the coherent summer in the present invention on the fourth clock pulse is the same as the output from the conventional coder and matched filter, showing the equivalence of the conjugator, weighting means and time-inverted delay means to a matched filter.

The advantage of the present invention over conventional matched filters is the large reduction of hardware that can be obtained for the same degree of performance. Thirty-two delay stages in the ISEM replace 1024 delay stages that would have to be used in a conventional matched filter to give the same results and a single DFT replaces many separate weighting circuits.

It should also be apparent that in the DFT circuit, the factor $e^{-j2\pi mk/N}$ could actually be any weight, or factor, indexed with respect to n and k.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Signal-processing means comprising:
   pulse coder means for providing a series of weighted pulses from a single input pulse, the time interval of the series being greater than that of said input pulse,
   said coder means including input-signal expansion means (ISEM) into which the input signal is fed, said ISEM comprising at least one delay stage, weighting means comprising a discrete Fourier transform circuit to which the output of the ISEM is fed, and a first time-dispersion means to which the outputs of said weighting means are fed for spreading the series of weighted pulses over a still greater time interval; and
   pulse-compression means, of the matched filter type including weighting means which is the same as that employed in said coder means, for receiving and processing echo signals corresponding to the output signals of said time-dispersion means.

2. Signal-processing means as in claim 1, wherein:
   said weighting means comprises a discrete Fourier transform circuit providing outputs in accordance with the formula $$s(k) = \sum_{n=0}^{N-1} x(n)e^{-j2\pi nk/N}$$

where n is the sequence number of the clocking pulse; N is the number of delay stages plus one; k is the number of the output signal from the transform circuit.

3. Signal-processing means as in claim 2, wherein said coder means includes:
   first coherent summer means, to which the output signals of said first time-dispersion means are fed, for separately summing the real and the imaginary parts of its input signals.

4. Signal-processing means as in claim 2, wherein said matched filter comprises:
   means for obtaining the complex conjugate of a signal corresponding to the coded output signal of said coder means, it being permissible for the coded signal and the corresponding signal to differ in phase;
   signal expansion means corresponding to said ISEM, the conjugated signal being processed through said signal expansion means in time-inverted order relative to the processing of the input pulse signal through said ISEM, the output signals of said signal expansion means being fed to said weighting means;
   second time-dispersion means to which the output signals of said weighting means are fed, the configuration of the second time-dispersion means being the same as that of the first time-dispersion means, except that delays are provided for input signals to the second in time-inverted order relative to delays provided for the input signals to the first.

5. Signal-dispersion means as in claim 4, further including:
   second coherent summer means, to which the output signals of said second time-dispersion means are fed, for separately summing the real and imaginary parts of its input signals.

6. Signal-processing means as in claim 5, further including:
   envelope detecting means to which the output signals of said second coherent summer means are fed.

* * * * *